United States Patent [19]

Ashley

[11] 3,976,845
[45] Aug. 24, 1976

[54] SWITCHING NETWORK HAVING IMPROVED TURN-ON CAPABILITY

[75] Inventor: Albert H. Ashley, Holliston, Mass.

[73] Assignee: GTE Sylvania Incorporated, Stamford, Conn.

[22] Filed: Dec. 8, 1975

[21] Appl. No.: 638,512

[52] U.S. Cl............................ 179/18 GF; 340/166 R
[51] Int. Cl.² ........................................... H04Q 3/50
[58] Field of Search ......... 179/18 GE, 18 E, 18 GF, 179/18 G, 18 H; 340/166 R; 307/252 J, 252 K, 299; 317/235 Z

[56] References Cited
UNITED STATES PATENTS

| | | |
|---|---|---|
| 3,819,867 | 6/1974 | McCarthy et al................ 179/18 GF |
| 3,826,873 | 7/1974 | Susi ................................ 179/18 GF |
| 3,936,612 | 2/1976 | Hjortendal et al. ............ 179/18 GE |

*Primary Examiner*—Thomas A. Robinson
*Attorney, Agent, or Firm*—David M. Keay; Elmer J. Nealon; Norman J. O'Malley

[57] ABSTRACT

Communication switching system employing several stages of solid state crosspoint switching circuits. Biasing current is supplied to the SCR's of the switching circuits by biasing current control arrangements which provide a relatively heavy current to SCR's being turned on and a relatively low current sufficient to sustain conduction to operating SCR's subsequent to their being turned on.

7 Claims, 5 Drawing Figures

SWITCHING NETWORK HAVING IMPROVED TURN-ON CAPABILITY

The invention herein described was made in the course of a contract with the Department of the Army.

BACKGROUND OF THE INVENTION

This invention relates to communication switching systems. More particularly, it is concerned with switching networks employing several stages of solid state crosspoint switching circuits.

Crosspoint switching arrays employing solid state devices have been developed for use in switching networks in communication systems. Switching arrays employing controlled latching semiconductor devices such as silicon controlled rectifiers (SCR's) are described and claimed in U.S. Pat. No. 3,456,084 entitled "Switching Network Employing Latching Type Semiconductors" which issued on July 15, 1969 to Ernest F. Haselton, Jr. Switching circuits which are particularly amenable to fabrication as monolithic integrated circuits are described and claimed in U.S. Pat. No. 3,826,873 entitled "Switching Circuit Employing Latching Type Semiconductor Devices and Associated Control Transistors" which issued on July 30, 1974 to A. Frederick Susi and U.S. Pat. No. 3,819,867 entitled "Matrix Employing Semiconductor Switching Circuit" which issued on June 25, 1974 to Jeremiah P. McCarthy and William Salmre.

The operating characteristics of the controlled latching semiconductor devices employed in these switching circuits are well-known. When a device is in the nonconducting condition and properly biased, current flow to the gate electrode causes current to flow between the anode and cathode turning the device on. The device continues to conduct after termination of the gate current as long as the current from the anode to the cathode exceeds a certain minimum current called the holding current. The device is restored to the nonconducting condition by momentary reduction of the current flowing therethrough to below the holding current.

As is well understood from the art of communication switching, solid state crosspoint switching circuits are arranged in networks so as to provide connections between signal transmission lines of different sets. Frequently the crosspoint switching circuits of a network are arranged in several stages so that a complete signal transmission signal path between two selected signal transmission lines require the activation of a crosspoint switching circuit in each of the several stages. Typically, biasing of the controlled latching semiconductor devices in a network is provided through the series connection of controlled latching semiconductor devices from stage to stage. That is, when a crosspoint switching circuit in each stage is selected to provide a signal transmission path through the network, biasing current is supplied to the controlled latching semiconductor devices of the selected switching circuits in series.

It has been found that when selected crosspoint switching circuits in several stages are turned on simultaneously, a problem of "current starving" may exist. Triggering current to the gate electrodes of the controlled latching semiconductor devices may deplete the series biasing current through the controlled latching semiconductor devices sufficiently that one or more of them fails to turn on. Sufficient current may be made available by employing sufficiently large biasing current sources. However, large biasing current sources introduce problems of high power consumption and dissipation together with related problems of power supply design and operation.

SUMMARY OF THE INVENTION

A communication switching system in accordance with the invention includes improved biasing current arrangements for providing sufficient biasing current to the controlled latching semiconductor devices of selected crosspoint switching circuits of several stages of a network to insure turn-on and subsequently providing a low biasing current sufficient only for holding the devices in conduction. The system includes a number of stages of crosspoint switching matrices arranged in order. Each stage of the system includes a plurality of cross-point switching circuits for connecting any one of a first set of signal transmission line groups to any one of a second set of signal transmission line groups. Each of the signal transmission line groups has at least one signal line and a control line. Each signal transmission line group of the first set of each stage is associated with each signal transmission line group of the second set of the same stage at different ones of the switching circuits of the same stage. Each signal transmission line group of the second set of each stage except the last stage in order is coupled to a different one of the signal transmission line groups of the first set of the next stage in order. The switching system thereby provides a multiplicity of possible signal transmission paths between signal transmission line groups of the first set of the first stage and signal transmission line groups of the second set of the last stage.

Each of the crosspoint switching circuits includes a controlled latching semiconductor device connected between each signal transmission line of the signal transmission line group of the first set and a signal transmission line of the signal transmission line group of the second set associated with the switching circuit. A triggering means is connected to the controlled latching semiconductor devices of the switching circuit and to the control lines of the signal transmission line groups of the first and second sets associated with the switching circuit. The application of coincident pulses to the control lines of the signal transmission line groups of the first and second sets associated with the switching circuit causes current to flow from the triggering means to the controlled latching semiconductor devices thereby switching the controlled latching semiconductor devices, when biased for conduction, to conduction and thus establishing signal transmission paths between the first and second sets of signal transmission line groups associated with the switching circuit.

Energizing potential means are connected to the signal lines of the first set of signal transmission line groups of the first stage. The system also includes a plurality of biasing current control means. Each biasing current control means is connected to the signal lines of a signal transmission line group of the second set of the last stage. Each of the biasing current control means includes a source of reference potential and a first switching means coupled between the signal lines of the signal transmission line group of the second set and the source of reference potential. The first switching means provides a first current path between each signal line and the source of reference potential when it is in a closed condition. Each biasing current control means also includes a second switching means coupled between the signal lines of the signal transmission line group of the second set and the source of reference potential. When it is in a closed condition the second switching means provides a second path between each signal line and the source of reference potential which is of less impedance than the first path.

A bistable means having a first and a second input connection is coupled to the first switching means. When the bistable means is in a first condition it causes the first switching means to be in the closed condition, and when it is in a second condition it causes the first switching means to be in the open condition. The bistable means is triggered from the second condition to the first condition by an input signal at the first input connection, and is triggered from the first condition to the second condition by an input signal at the second input connection. The second switching means is coupled to the first input connection of the bistable means and is biased to the closed condition during the presence of an input signal at the first input connection.

An input signal at the first input connection of a bistable means during coincident pulses to control lines of selected crosspoint switching circuits switches the bistable means to the first condition causing the associated first switching means to be closed. The second switching means is also closed during the input signal thereby permitting sufficient current to flow through the controlled latching semiconductor devices of the selected crosspoint switching circuits to cause the controlled latching semiconductor devices to become conductive and establish a signal transmission path through the system. Termination of the input signal to the first input connection of the bistable means opens the second switching means while the first switching means remains closed, thus permitting sufficient holding current to flow through the controlled latching semiconductor devices of the selected crosspoint switching circuits to maintain conduction therethrough. A subsequent input signal at the second input connection of the bistable means switches the bistable means to the second condition causing the first switching means to be opened. Current flow through the controlled latching semiconductor devices of the selected crosspoint switching circuits is interrupted causing them to become nonconductive and terminating the established signal transmission path through the system.

BRIEF DESCRIPTION OF THE DRAWINGS

Additional objects, features, and advantages of communication switching systems incorporating biasing current control arrangements in accordance with the present invention will be apparent from the following detailed discussion together with the accompanying drawings wherein.

DETAILED DESCRIPTION OF THE INVENTION

Figure 1:
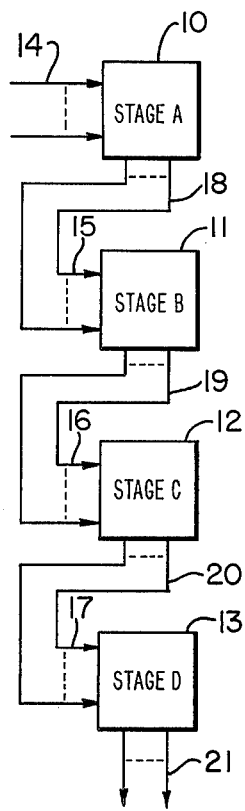
FIG. 1 is a simplified block diagram representing a fourstage switching network employing solid state switching circuits.
Figure 3:
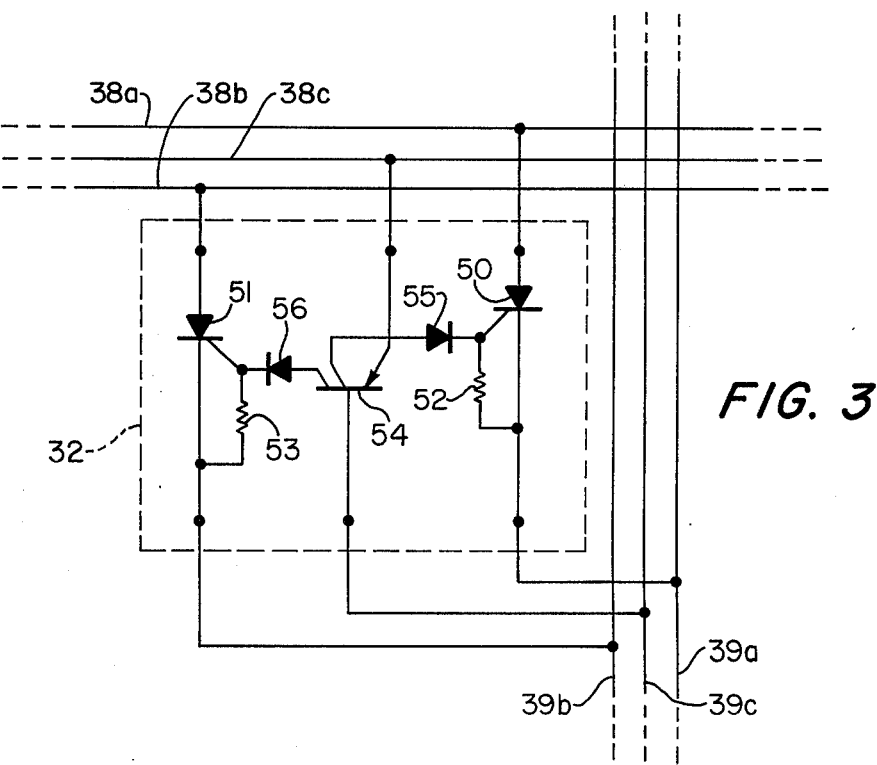
FIG. 3 is a detailed circuit diagram of a particular embodiment of a solid state crosspoint switching circuit which may be employed in the network of FIG. 1 as an individual circuit of the representation of FIG. 2.

FIG. 1 is a general representation of a communication switching network employing four stages A-D 10, 11, 12, and 13 of matrices of crosspoint switching circuits of the type shown, for example, in FIG. 3. Each stage A-D 10, 11, 12, and 13 has an associated first set of signal transmission line groups 14, 15, 16, and 17, respectively, and an associated second set of signal transmission line groups 18, 19, 20, and 21, respectively. Within each stage an array of switching circuits provides a matrix of crosspoints for connecting each of the signal transmission line groups of the associated first set with each of the signal transmission line groups of the associated second set. Thus, by activation of the appropriate crosspoint switching circuit in each of the stages A-D a particular one of the signal transmission line groups of the first set 14 of stage A may be connected with a particular signal transmission line group of the second set 21 of stage D. The specific arrangement of matrices of crosspoint switches within each stage and the specific interconnections between succeeding stages depend on the particular requirements of the communication system and are of no consequence in understanding the present invention.

Figure 2:
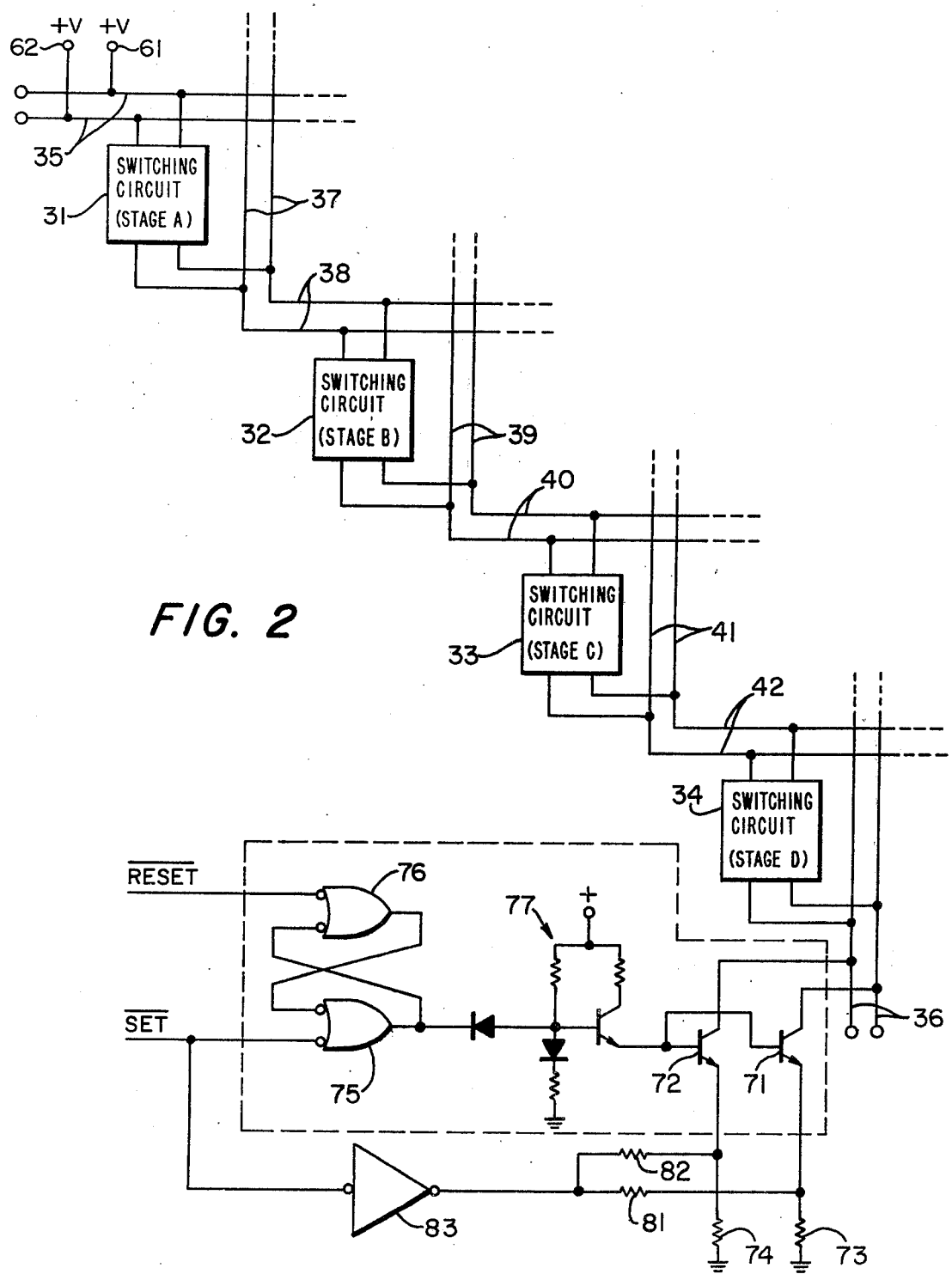
FIG. 2 is a representation of selected crosspoint switching circuits, one in each of the four stages of the switching network of FIG. 1, for establishing, when activated, a particular signal transmission path through the network; together with biasing current control circuitry for controlling the current flow through the controlled latching semiconductor devices of the selected switching circuits.

FIG. 2 is illustrative of a specific path through stages A-D by way of a specific individual crosspoint switching circuit in each stage. The switching circuits 31, 32, 33, and 34 provide a unique path between a particular signal transmission line group 35 of the first set of stage A and a particular signal transmission line group 36 of the second set of stage D.

The switching circuit 31 of stage A connects the signal lines of the signal transmission line group 35 to the signal lines of the signal transmission line group 37. The signal lines of the signal transmission line group 37 of stage A are connected to the signal lines of signal transmission line group 38 of stage B. Switching circuit 32 of stage B connects the signal lines of signal transmission line group 38 to the signal lines of signal transmission line group 39. The signal lines of signal transmission line group 39 are connected to the signal lines of signal transmission line group 40 of stage C. Switching circuit 33 of stage C connects the signal lines of signal transmission line group 40 to the signal lines of signal transmission line group 41. The signal lines of signal transmission line group 41 are connected to the signal lines of signal transmission line group 42 of stage D. Switching circuit 34 connects the signal lines of signal transmission line group 42 to the signal lines of signal transmission line group 36. Thus when switching circuits 31, 32, 33, and 34 are activated, a signal transmission path is provided between the signal lines of signal transmission line group 35 and the signal lines of signal transmission line group 36. In the specific system illustrated each signal transmission line group has two signal lines. Each signal transmission line group also includes a control line which is not shown in FIG. 2, but is shown in the detailed circuit diagram of FIG. 3.

FIG. 3 illustrates in detail one specific embodiment of a solid state switching circuit 32 for use in systems in accordance with the invention. The circuit is of the type described and claimed in the aforementioned patent to McCarthy and Salmre. In this circuit a first SCR 50 has its anode connected to the signal line 38a of the signal transmission line group 38 of the first set and its cathode connected to the signal line 39a of the signal transmission line group 39 of the second set. A second SCR 51 has its anode connected to the signal line 38b and its cathode connected to the signal line 39b. Resistances 52 and 53 are connected between the gate electrode and cathode of the first and second SCR's 50 and 51, respectively. A dual collector PNP control transistor 54 has its emitter connected to the control line 38c of the signal transmission line group 38 of the first set and its base connected to the control line 39c of the signal transmission line group 39 of the second set. One collector of PNP transistor 54 is connected through a blocking diode 55 to the gate electrode of the first SCR 50. The second collector of the PNP transistor 54 is connected through a blocking diode 56 to the gate electrode of the second SCR 51.

When coincident positive-going and negative-going pulses are applied to the control lines 38c and 39c, respectively, transistor 54 is forward biased to conduction. Neither of the pulses alone is sufficient to bias a control transistor to conduction. Assuming appropriate biasing conditions are present at the signal lines 38a and 38b and signal lines 39a and 39b, as will be explained in detail hereinbelow, collector current from transistor 54 flows to the gate electrodes of the SCR's 50 and 51 triggering them to conduction. Low impedance signal transmission paths are thus established between signal lines 38a and 39a and signal lines 38b and 39b through SCR's 50 and 51, respectively.

The operating characteristics of controlled latching semiconductor devices such as SCR's are well-known. When appropriate biasing conditions are applied to the anode and cathode, current flow into the gate electrode causes an SCR to become conductive and thus present a low impedance path to current flow. In order to sustain this low impedance path a small DC current called the holding current must continue to flow between the anode and cathode of the SCR. The SCR may be turned off to become nonconductive and return to the high impedance condition by a momentary reduction of the current to below the holding current.

The arrangement for biasing the SCR's of the switching system includes the provision of a positive energizing potential to the signal lines of the signal transmission line groups of the first set of stage A. This potential may be provided from elsewhere in the system and is represented as being present at terminals 61 and 62 in FIG. 2. The signal lines of each of the signal transmission line groups of the second set of stage D are coupled to ground by biasing current control circuitry.

FIG. 2 illustrates biasing current control circuitry in accordance with the present invention connected to the signal lines 36 of the transmission line group of the second set of stage D. Each of the two signal lines of the signal transmission line group 36 is connected to ground through a series connected transistor switch 71 and 72 and a resistance 73 and 74, respectively. The conductive conditions of the transistor switches 71 and 72 are controlled by a bistable arrangement of two cross-connected NOR gates 75 and 76 as illustrated in FIG. 2. The output of the bistable arrangement of gates 75 and 76 is applied to the bases of the switching transistors 71 and 72 through an amplifier 77. The circuit elements of transistors 71 and 72, NOR gates 75 and 76, and amplifier 77 together with their electrical connections may be fabricated as a single monolithic integrated circuit.

The bistable arrangement has a $\overline{SET}$ input to NOR gate 75 and a $\overline{RESET}$ input to NOR gate 76. In the normal reset condition the bistable arrangement produces a relatively low output voltage which passes through the amplifier 77 to transistors 71 and 72 biasing them in the nonconducting or open condition. A negative-going pulse at the $\overline{SET}$ input triggers the bistable arrangement to the set condition producing a relatively high output voltage to the amplifier 77 which in turn causes transistors 71 and 72 to become conductive or act as closed switches. Thus, when the bistable arrangement is in the set condition the signal lines 36 are connected to ground through the respective resistances 73 and 74. When the transistors 71 and 72 are closed and amplifier 77 is activated the amplifier establishes a fixed voltage at the emitters of the transistors 71 and 72 thus providing with resistances 73 and 74 fixed current sources connected to the signal lines 36.

Resistances 81 and 82 are also connected to the junctures of the emitters of transistors 71 and 72 and resistances 73 and 74, respectively. The resistances 81 and 82 are connected to a solid state switching circuit 83 which when closed provides a path to ground. The control input to the switching circuit 83 is connected to the $\overline{SET}$ input to the bistable arrangement 75 and 76. The switching circuit 83 becomes conductive producing a closed switch connecting the emitters of switching transistors 71 and 72 to ground through resistances 81 and 82, respectively, during the presence of a negative-going signal at the $\overline{SET}$ input. In the absence of a negative-going signal the switching circuit 83 provides a high impedance or open switch between the emitters of transistors 71 and 72 and ground through resistances 81 and 82, respectively.

Figure 4A:
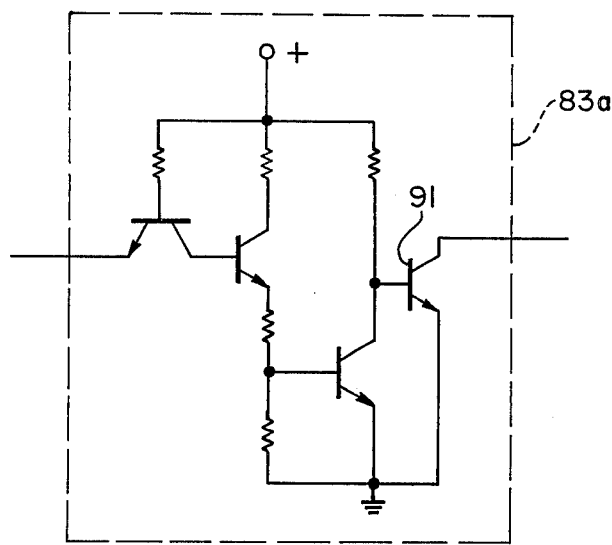
FIGS. 4A and 4B show circuit details of alternative circuitry which may be employed as part of the biasing current control arrangement of FIG. 2.
Figure 4B:
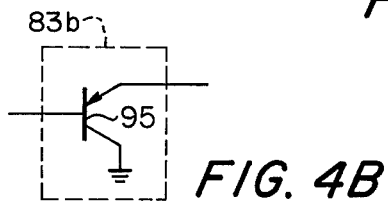

Two possible alternatives for the switching circuit 83 are illustrated in FIGS. 4A and 4B, respectively. FIG. 4A illustrates a circuit 83a which is a standard integrated circuit such as an SN5407 non-inverting buffer with open collector. The open collector switching transistor 91 is conductive while a negative-going signal is present at the $\overline{SET}$ input. FIG. 4B illustrates a circuit 83b of a single PNP switching transistor 95. For either circuit 83a or 83b when the transistor 91 or 95 becomes conductive by virtue of a low level signal at the $\overline{SET}$ input, a closed circuit exists from the emitters of transistors 71 and 72 through resistances 81 and 82, respectively, and through transistor 91 or 95 to ground.

The biasing current control circuitry operates in the following manner when switching circuits 31, 32, 33, and 34 of stages A, B, C, and D are selected so as to provide a signal transmission path between signal lines 35 of stage A and signal lines 36 of stage D. Coincident positive-going and negative-going control pulses are applied to the control lines of the first and second sets of signal transmission line groups, respectively, associated with the four selected switching circuits 31, 32, 33, and 34, for example, control lines 38c and 39c of switching circuit 32 as shown in FIG. 3. Circuitry of the type described in patent application Ser. No. 520,413 entitled "Drive Circuitry with Error Detection" filed Nov. 4, 1974 by Albert H. Ashley, now U.S. Pat. No. 3,940,571, issued Feb. 24, 1976, may be employed to apply the pulses to the control lines. Coincident with the control pulses to the control lines a negative-going $\overline{SET}$ signal is applied at the $\overline{SET}$ input of the biasing current control circuit associated with the proper signal transmission line group 36 of the second set of stage D.

The negative-going signal applied at the $\overline{SET}$ input causes the bistable arrangement of gates 75 and 76 to change to the set condition producing a positive-going output level which is amplified by the amplifier 77 and causes switching transistor 71 and 72 to be biased to conduction. Also during the negative-going pulse the transistor switch of circuit 83 is also closed. Since, as explained previously, a fixed voltage is thereby established at the emitters of transistors 71 and 72, current sources are established between the emitters and ground through parallel resistances 73 and 81 and 74 and 82, respectively.

During the negative-going signal at the $\overline{SET}$ input, the driving pulses on the control lines are causing the control transistors of each selected switching circuit, for example, transistor 54 of switching circuit 32 as shown in FIG. 3, to be conductive. The combination of the triggering current from the control transistor to the gate electrodes of the SCR's together with proper biasing conditions provided by all the switching transistors of the biasing current control circuitry being closed causes the SCR's in the selected switching circuits 31, 32, 33, and 34 to become conductive. Adequate current is supplied by the biasing arrangement during the turn-on period to insure that none of the SCR's in the two branches of the signal transmission path being established is "starved" for sufficient current to insure turn-on.

Upon termination of the negative-going $\overline{SET}$ signal and also of the coincident pulses to the control lines, the switching transistor of circuit 83 reverts to the open condition and the flow of biasing current in the SCR's is through closed switching transistors 71 and 72 and resistances 73 and 74, respectively. With the increased resistance in the paths between the amplifier 77 and ground, the current flow from the current source is reduced. The amount of the reduced current is sufficient to maintain the holding current through each of the four SCR's in series to insure that they remain conducting. The holding current is typically much less than the turn-on current required to insure that all the SCR's become conductive.

Biasing current sufficient to sustain conduction continues to flow through the SCR's in the switching circuits 31, 32, 33, and 34 thus providing a low impedance signal transmission path between the signal lines of transmission line groups 35 and 36. The established signal transmission path is disrupted by a negative-going $\overline{RESET}$ signal at the $\overline{RESET}$ input to the bistable arrangement 75 and 76. The bistable arrangement is triggered to the reset condition and a relatively low level voltage is applied to the amplifier 77 and to the switching transistors 71 and 72. Switching transistors 71 and 72 are biased to nonconduction providing open switches in the SCR's biasing current circuits thereby interrupting the current flow so that the SCR's return to their nonconductive high impedance condition.

Thus, the biasing current control circuitry as described provides a relatively high current source to the SCR's when needed during turn-on and a relatively low current source sufficient to sustain conduction during the operating period after turn-on. Adequate current is therefore available to insure turning on of all the SCR's in the selected crosspoint switching circuits and excessive power is not consumed during steady state operation of the SCR's after turn-on.

While there has been shown and described what is considered a preferred embodiment of the present invention, it will be obvious to those skilled in the art that various changes and modifications may be made therein without departing from the invention as defined in the appended claims.

What is claimed is:

1. A switching system comprising
  a number of stages of crosspoint switching matrices arranged in order, each stage including
    a plurality of crosspoint switching circuits,
    a first set of signal transmission line groups, each group having at least one signal line and a control line, and
    a second set of signal transmission line groups, each group having at least one signal line and a control line;
  each signal transmission line group of the first set of each stage being associated with each signal transmission line group of the second set of the same stage at different ones of the crosspoint switching circuits of the same stage;
  each signal transmission line group of the second set of each stage except the last in order being coupled to a different one of the signal transmission line groups of the first set of the next stage in order;
  whereby the switching system provides a multiplicity of possible signal transmission paths between signal transmission line groups of the first set of the first stage and signal transmission line groups of the second set of the last stage;
  each crosspoint switching circuit including
    a controlled latching semiconductor device connected between each signal transmission line of the signal transmission line group of the first set and a signal transmission line of the signal transmission line group of the second set associated with the crosspoint switching circuit, and
    triggering means connected to the controlled latching semiconductor devices of the crosspoint switching circuit and to the control lines of the signal transmission line groups of the first and second sets associated with the crosspoint switching circuit,
    the application of coincident pulses to the control lines of the signal transmission line groups of the first and second sets associated with the crosspoint switching circuit causing current flow from the triggering means to the controlled latching semiconductor devices thereby switching the controlled latching semiconductor devices, when biased for conduction, to conduction and establishing signal transmission paths between the first and second sets of signal transmission line groups associated with the crosspoint switching circuit;
  energizing potential means connected to the signal lines of the first set of signal transmission line groups of the first stage;
  a plurality of biasing current control means, each connected to the signal lines of a signal transmission line group of the second set of the last stage;
  each biasing current control means including
    a source of reference potential,
    first switching means coupled between the signal lines of the signal transmission line group of the second set and the source of reference potential for providing a first current path between each signal line and the source of reference potential when in a closed condition, second switching means coupled between the signal lines of the signal transmission line group of the second set and the source of reference potential for providing a second path between each signal line and the source of reference potential of less impedance than the first path when in a closed condition, bistable means having a first and a second input connection and being coupled to said first switching means, said bistable means being operable when in a first condition to cause said first switching means to be in the closed condition and being operable when in a second condition to cause said first switching means to be in the open condition, said bistable means being operable to be triggered from the second condition to the first condition in response to an input signal at the first input connection and to be triggered from the first condition to the second condition in response to an input signal at the second input connection, said second switching means being coupled to the first input connection of the bistable means and being biased to the closed condition during the presence of an input signal at the first input connection;

whereby the presence of an input signal at the first input connection of said bistable means during coincident pulses to control lines of selected crosspoint switching circuits switches the bistable means to the first condition causing the associated first switching means to be closed and also closing the second switching means during the input signal thereby permitting sufficient current to flow through the controlled latching semiconductor devices of the selected crosspoint switching circuits to cause the controlled latching semiconductor devices to become conductive and establish a signal transmission path through the system, termination of the input signal to the first input connection of the bistable means opening the second switching means while the first switching means remains in the closed condition permitting sufficient holding current to flow through the controlled latching semiconductor devices of the selected crosspoint switching circuits, and subsequent input signal at the second input connection of the bistable means switching the bistable means to the second condition causing the first switching means to be opened thereby interrupting current flow through the controlled latching semiconductor devices of the selected crosspoint switching circuits causing them to become nonconductive and terminating the established signal transmission path through the system.

2. A switching system in accordance with claim 1 wherein each of said controlled latching semiconductor devices of a crosspoint switching circuit has first and second signal electrodes and a gate electrode, the first and second signal electrodes being connected to the signal lines of the associated signal transmission line groups of the first and second sets, respectively, and the gate electrode being coupled to the associated triggering means; and each of said controlled latching semiconductor devices is operable to be switched to conduction in response to a momentary flow of current to the gate electrode when a current path is established through the controlled latching semiconductor devices from an energizing potential means to a source of reference potential by closing of the first and second switching means of a biasing current control means whereby current from the associated triggering means switches the controlled latching semiconductor device to conduction providing a signal transmission path therethrough.

3. A switching system in accordance with claim 2 wherein each triggering means of each crosspoint switching circuit includes a transistor means having an emitter connection to the control line of the associated signal transmission line group of one of the sets, a base connection to the control line of the associated signal transmission line group of the other set, and a collector connection to the gate electrode of each of the controlled latching semiconductor devices of the crosspoint switching circuit.

4. A switching system in accordance with claim 2 wherein each baising current control means includes current source means coupled to the bistable means and operable when the bistable means is in the first condition and said first switching means is closed to cause a first predetermined current to flow through said first path to said source of reference potential whereby a first predetermined amount of current is available to the controlled latching semiconductor devices of the selected crosspoint switching circuits, and said current source means being operable when the bistable means is in the first condition and said second switching means is closed to cause a second predetermined current greater than said first current to flow through said second path to said source of reference potential whereby a second predetermined amount of current greater than said first amount of current is available to the controlled latching semiconductor devices of the selected crosspoint switching circuits.

5. A switching circuit in accordance with claim 2 wherein said first switching means of each biasing current control means includes a first switching device and an associated first resistance connected in series between each of the signal lines of the signal transmission line group of the second set and the source of reference potential;

each of said first switching devices being coupled to the bistable means and being in the closed condition when the bistable means is in the first condition and being in the open condition when the bistable means is in the second condition;

said second switching means of each of said biasing current control means includes a second switching device connected to the source of reference potential and a second resistance connected between the second switching device and the juncture of each first switching device and its associated first resistance;

said second switching device being connected to the first input connection of the bistable means and being in the closed condition during the presence of an input signal at the first input connection;

whereby when the bistable means of a biasing current control means is in the second condition, the first and second switching devices are open; when the bistable means is in the first condition and an input signal is present at the first input connection, the first and second switching means are closed permitting current flow through the first and second resistances in parallel; and when the bistable means is in the first condition and an input signal is not present at the first input connection, the first switching device is closed and the second switching device is open permitting current flow through the first resistances.

6. A switching system in accordance with claim 5 wherein each biasing current control means includes
current source means coupled to the bistable means and to the first switching devices and operable when the bistable means is in the first condition and said first switching devices are closed to produce a substantially constant potential at the juncture of each first switching device and its associated first resistance;
whereby when the first switching devices are closed and the second switching device is open, a first predetermined amount of current is available to the controlled latching semiconductor devices of the selected crosspoint switching circuits; and when the first and second switching devices are closed, a second predetermined amount of current greater than said first amount of current is available to the controlled latching semiconductor device of the selected crosspoint switching circuits.

7. A switching system in accordance with claim 6 wherein
each triggering means of each crosspoint switching circuit includes a transistor means having an emitter connection to the control line of the associated signal transmission line group of one of the sets, a base connection to the control line of the associated signal transmission line group of the other set, and a collector connection to the gate electrode of each of the controlled latching semiconductor devices of the crosspoint switching circuit.

* * * * *